Hayes & Cuatt,
Pruning Shears.
No. 96,232. Patented Oct. 26, 1869.

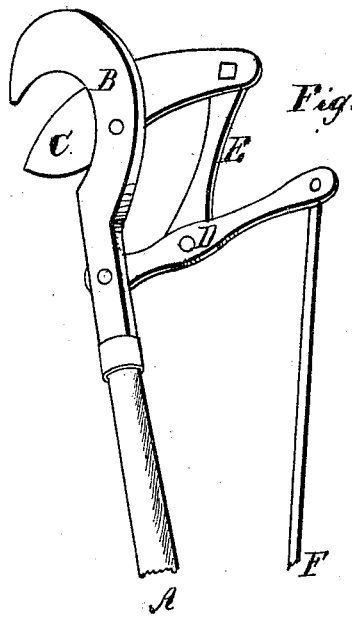
Fig. 1
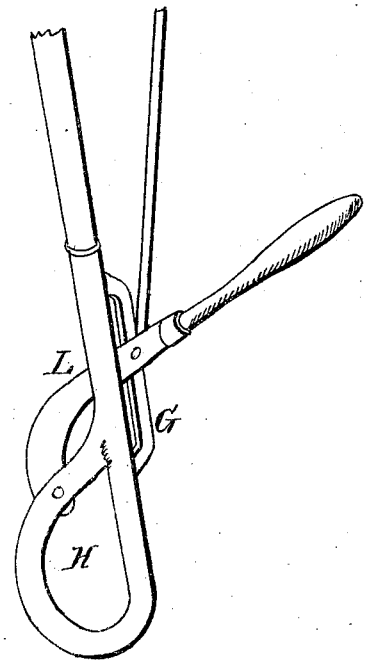
Witnesses
Albert Ralph
Otto L. Johnson
Inventors
Angel Hayes
Lewis Cuatt

United States Patent Office.

VIRGIL HAYES, OF TEKONSHA, AND LEWIS CUATT, OF ECKFORD, MICHIGAN.

Letters Patent No. 96,232, dated October 26, 1869.

IMPROVEMENT IN PRUNING-SHEARS.

The Schedule referred to in these Letters Patent and making part of the same.

*To all whom it may concern:*

Be it known that we, VIRGIL HAYES, of Tekonsha, and LEWIS CUATT, of Eckford, both in the county of Calhoun, and State of Michigan, have invented a new and useful Improvement in Pruning-Shears; and we do hereby declare the following to be a full, clear, and exact description of the same, reference being had to the annexed drawings, forming a part of this specification, in which—

Figure 1 is a perspective view.

Similar letters indicate corresponding parts in both figures.

Figure 2:
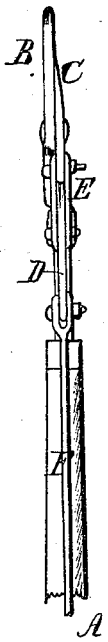
Figure 2 is an end elevation or edge view of modified construction.

Our invention relates to that class of implements for pruning trees, &c., that encloses the limb or shoot between a movable cutting-blade and a stationary cutting-hook, which is mounted on a pole, the movable blade being connected, through intermediate levers, to a primary lever, actuated by one hand of the operator, while grasping the pole with the other.

The varying conditions under which the superfluous limbs and shoots of trees are presented to the operator, in the act of pruning, demand a more favorable arrangement of the cutting and actuating-parts, both in relation with each other, and with the pole to be grasped firmly against the cutting-action, than have been hitherto used for such purpose, as will hereinafter be more fully explained; and to better enable those skilled in this art to construct our improvement, we will proceed to give a sufficiently minute description of the same.

A represents the pole, broken in the middle, to indicate its want of proportionate length.

One end is furnished with a stationary hook-shaped blade, B, the concave edge being made sharp, to take hold of the limb to be cut, or to lop off small twigs with. The other or lower end is provided with a handle, H, shaped either as shown or in any similar manner, so that it may be conveniently grasped by introducing the hand, so as to steady the pole against the cutting-action.

C is the cutting-blade, which we pivot to the hook B, like a pair of shears, the pivot-hole in the said blade being made low down, near the back edge, or in a projection forged in the back, for the purpose of producing a smooth drawing-cut.

Below, and in line with the shank of the cutting-blade C, (which shank may be extended to serve as a lever,) we pivot the end of a lever-bar, D, to the shank of the hook B, and link the two together by the link-bar E, so as to obtain a compound leverage, substantially as seen.

The long end of the bar D is jointed to the short end of the hand-lever L by the rod F.

We curve the pivoted end of the hand-lever, and pivot it to the bent handle on the cutting-side of the pole, and work the lever within a guard, G, so that when the lever is fully depressed, at the completion of the cut, it will not encroach materially on the handle-space, and the hand of the operator will be fully protected.

We do not desire to confine ourselves to the exact construction in fig. 1, where the handle is shown as connected to the pole by a socket-insertion, for the handle may be very advantageously formed, by bending the pole itself, in the usual manner of steaming and bending wood, or the pole may be constructed of a piece of light metal tubing, and bent to form the handle, in the ordinary way of bending tubes.

The operation will be readily understood without any further description.

Fig. 2 exhibits a modified construction, in which, if desired, the levers, &c., may work centrally, by making a slight lateral bend in the hook-shank, using a double link, forking one end of the lever D and the ends of the connecting-rod F.

The hand-lever, in this case, will work in a guard-slot, cored out in the socket or other shank of a cast handle.

We know that triple-lever arrangements have been used to operate a vibrating cutting-blade in connection with a cutting-hook, but in none that we have seen have the operating parts been so arranged, relatively with the pole and each other, that the operator can prune with a "drawing-cut," by pulling the primary hand-lever toward him, as in our arrangement, whereby his power on the triple leverage is most favorably exerted.

In addition to this advantage, the relation which our curved handle bears to the prime hand-lever, simplifies the implement, make its whole length available, and enables the operator to apply it more extensively and in more diversified positions, from a single stand point, than is usual, and thus greatly expedites and relieves the laborious operation of pruning trees.

What we claim as our invention, and desire to secure by Letters Patent, is as follows:

The pruning-shears, herein described, consisting of the hook B, pivoted blade C, link E, lever D, rod F, curved hand-lever L, pole A, and bent handle H, with guard G, all constructed, arranged, and operating substantially as set forth.

VIRGIL HAYES.
LEWIS CUATT.

Witnesses:
ALBERT PATCH,
OTTO L. JOHNSON.